United States Patent [19]
Goto et al.

[11] Patent Number: 5,092,199
[45] Date of Patent: Mar. 3, 1992

[54] HYDRAULIC CONTROL APPARATUS FOR AUTOMATIC TRANSMISSIONS

[75] Inventors: Shigeki Goto; Yoshitami Saitou, both of Aichi, Japan

[73] Assignee: Aisin Seiki Kabushiki Kaisha, Aichi, Japan

[21] Appl. No.: 501,772

[22] Filed: Mar. 30, 1990

[30] Foreign Application Priority Data

Mar. 31, 1989 [JP] Japan .................................. 1-78327

[51] Int. Cl.$^5$ ............................................ B60K 41/06
[52] U.S. Cl. .................... 74/866; 364/424.1; 74/867
[58] Field of Search ................. 74/866, 867, 868, 869; 364/424.1

[56] References Cited

U.S. PATENT DOCUMENTS

| | | | |
|---|---|---|---|
| 4,041,809 | 8/1977 | Dick et al. | 74/866 |
| 4,370,903 | 2/1983 | Stroh et al. | 74/866 X |
| 4,527,678 | 7/1985 | Pierce et al. | 74/866 X |
| 4,667,540 | 5/1987 | Yagi | 74/866 |
| 4,680,988 | 7/1987 | Mori | 74/866 |
| 4,942,530 | 7/1990 | Boda et al. | 74/866 X |
| 4,953,090 | 8/1990 | Narita | 364/424.1 |
| 4,955,259 | 9/1990 | Narita | 74/867 X |

FOREIGN PATENT DOCUMENTS

63-214550 9/1988 Japan .

*Primary Examiner*—Allan D. Herrmann
*Assistant Examiner*—Benjamin Levi
*Attorney, Agent, or Firm*—Burns, Doane, Swecker & Mathis

[57] ABSTRACT

A hydraulic control apparatus for an automatic transmission has friction elements for performing a downshift by releasing one friction engaging element and engaging another. The apparatus includes duty control valves connected to the friction engaging elements, duty solenoid valves connected to oil lines for supplying pilot hydraulic pressure to the duty control valves, and control means. In a case where a release duty signal is outputted to one duty solenoid valve to control the pilot hydraulic pressure to thereby release the one friction engaging element, and downshift is a power-on downshift, the control means raises the duty ratio of the other duty solenoid valve to a predetermined valve to raise engaging hydraulic pressure supplied to the other friction element when rotational speed of the transmission input shaft is greater than a difference between the product of output shaft rotational speed and low-side gear ratio and a rotational speed commensurate with a delay in engine speed upturn.

5 Claims, 6 Drawing Sheets

HYDRAULIC CONTROL APPARATUS FOR AUTOMATIC TRANSMISSIONS

FIELD OF THE INVENTION

This invention relates to a hydraulic control apparatus of an electronically controlled automatic transmission in which the servo hydraulic pressure of friction engaging elements, such as clutches and brakes which act upon the various gear elements of the automatic transmission, is controlled by duty solenoid valves.

BACKGROUND OF THE INVENTION

In order to alleviate shift shock when performing a power-on downshift (kick-down) in a conventional hydraulic control apparatus of an automatic transmission which controls a shifting operation by changing over a plurality of friction engaging elements such as clutches and brakes, control is executed to reduce the shock by mechanically controlling hydraulic pressure using timing valves.

One example of a hydraulic control apparatus using timing valves of this kind is disclosed in the specification of Japanese Patent Application Laid-Open (KOKAI) No. 63-214550 (1988). This disclosed apparatus has a downshift timing valve connected to the release side of a brake element actuator, and is adapted to alleviate shift shock at the time of a downshift by controlling the operation of the timing valve.

DISCUSSION OF PROBLEMS IN THE ART

In this arrangement wherein shift shock at the time of a downshift is mechanically mitigated by using the timing valve, the assembly precision and dimensional precision of the timing valve have a subtle influence and it is difficult to completely eliminate differences in performance. In order to eliminate such differences, great care and cost are required for obtaining assembly and dimensional precision. Since this conventional apparatus is so adapted that control is carried out on the release side of the actuator, complicated control such as control using a learning technique is required in order to control disparities or fluctuation in apply hydraulic pressure and engine rev-up speed.

SUMMARY OF THE DISCLOSURE

An object of the present invention is to solve the aforementioned drawbacks of the conventional hydraulic control apparatus for an automatic transmission.

More specifically, an object of the present invention is to provide a hydraulic control apparatus for an automatic transmission in which precision is improved and control is simplified in order to alleviate shift shock at the time of a downshift, particularly a power-on downshift.

According to the present invention, the foregoing objects are attained by providing a hydraulic control apparatus for an automatic transmission having a plurality of friction elements for performing a downshift by releasing one friction engaging element and engaging another friction engaging element, comprising:

duty control valves connected to respective ones of the friction engaging elements, duty solenoid valves connected to oil lines for supplying pilot hydraulic pressure to respective ones of the duty control valves, and control means so adapted that in a case where a release duty signal is outputted to one duty solenoid valve to control the pilot hydraulic pressure to thereby release the one friction element, and a downshift is a power-on downshift, the duty ratio of the other duty solenoid valve is raised to a predetermined value to raise engaging hydraulic pressure supplied to the other friction engaging element when rotational speed of an input shaft of the automatic transmission is greater than a difference between the product of output shaft rotational speed and low-side gear ratio and a rotational speed commensurate with a delay in engine speed upturn.

According to the features of the present invention, the timing for starting the hydraulic pressure to the friction element on the engaging side is accurately set. As a result, after the one friction engaging element (may be referred to as "friction element") is released, the gear train of the automatic transmission is placed in the neutral state owing to disengagement of the one friction element. This makes it possible to effectively prevent engine rev-up and shift shock at kick-down.

Further, in the present invention, control of the hydraulic pressure of the two friction elements that contribute to the downshift is performed on the apply side and not the release side. As a result, highly precise control can be performed even if there is a fluctuation in engine torque and differences in the rate at which engine rotational speed increases.

In the hydraulic control apparatus of the invention, a release duty signal is outputted to one duty solenoid valve to actuate this duty solenoid valve, whereby pilot hydraulic pressure to one duty control valve is controlled. At the same time, it is determined whether a downshift is a power-on down shift, namely kick-down. When, in case of kick-down, the rotational speed (turbine rotational speed $N_T$) of the automatic transmission input shaft becomes greater than the difference ($N_{TD} = N_T \times i - \Delta N_{TD}$) between the product of the turbine shaft rotational speed ($N_T$ in rotational number) and the low-side gear ratio (i) and the rotational speed ($\Delta N_{TD}$) commensurate with the delay in the rise of rotation of the input shaft, the duty ratio of the other duty solenoid valve is raised to a predetermined value (from a to b %) to raise, in the controlled state, the engaging hydraulic pressure to the other friction element, thereby optimizing the timing of a rise in the hydraulic pressure supplied to this engaged-side friction element. Owing to this operation of the control means, the timing for engaging the other friction element after the one friction element is released is adjusted, and the gear train of the automatic transmission is placed in the neutral state by the disengagement of the one friction element. This makes it possible to effectively prevent engine rev-up and shift shock at kick-down.

The rotational speed ($\Delta N_\theta$) commensurate with the delay in the rise of rotation of the input shaft is a value which varies in conformity with vehicle velocity. Therefore, it is desired that $\Delta N_\theta$ be corrected in conformity with vehicle velocity at the time of a kick-down shift.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
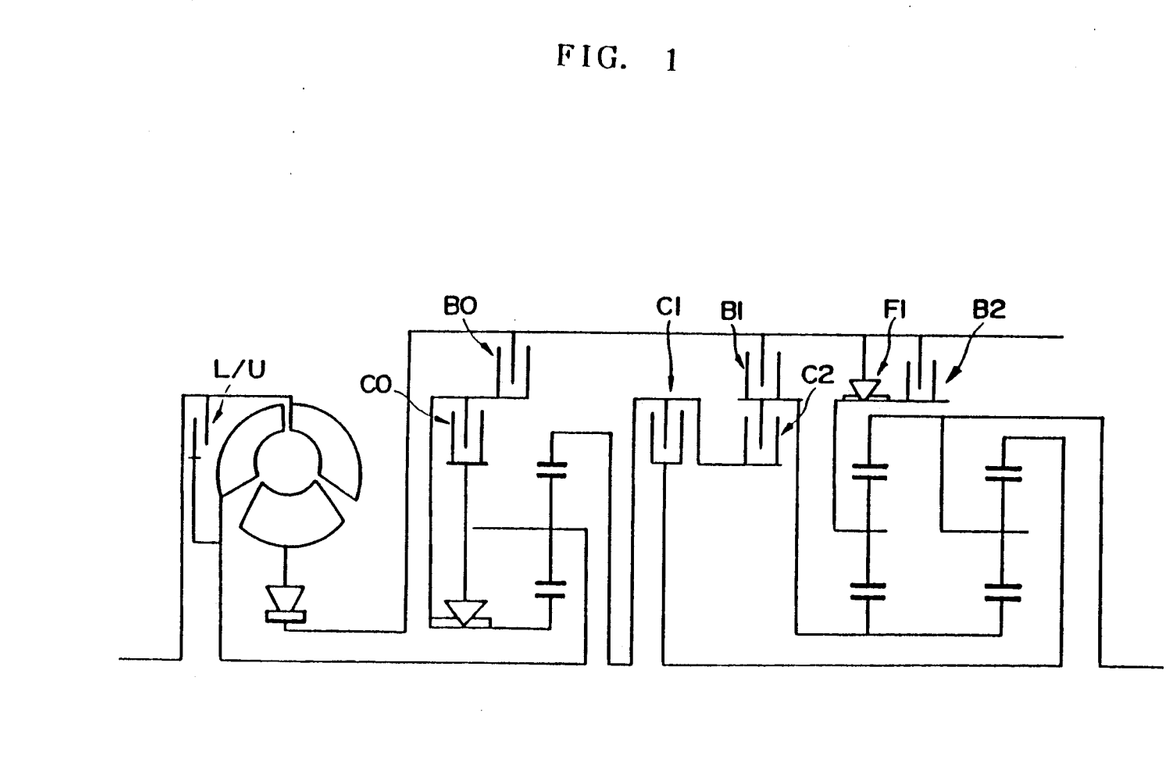
FIG. 1 is a diagram showing a gear train of an example of an automatic transmission controlled by the present invention.
Figure 2:
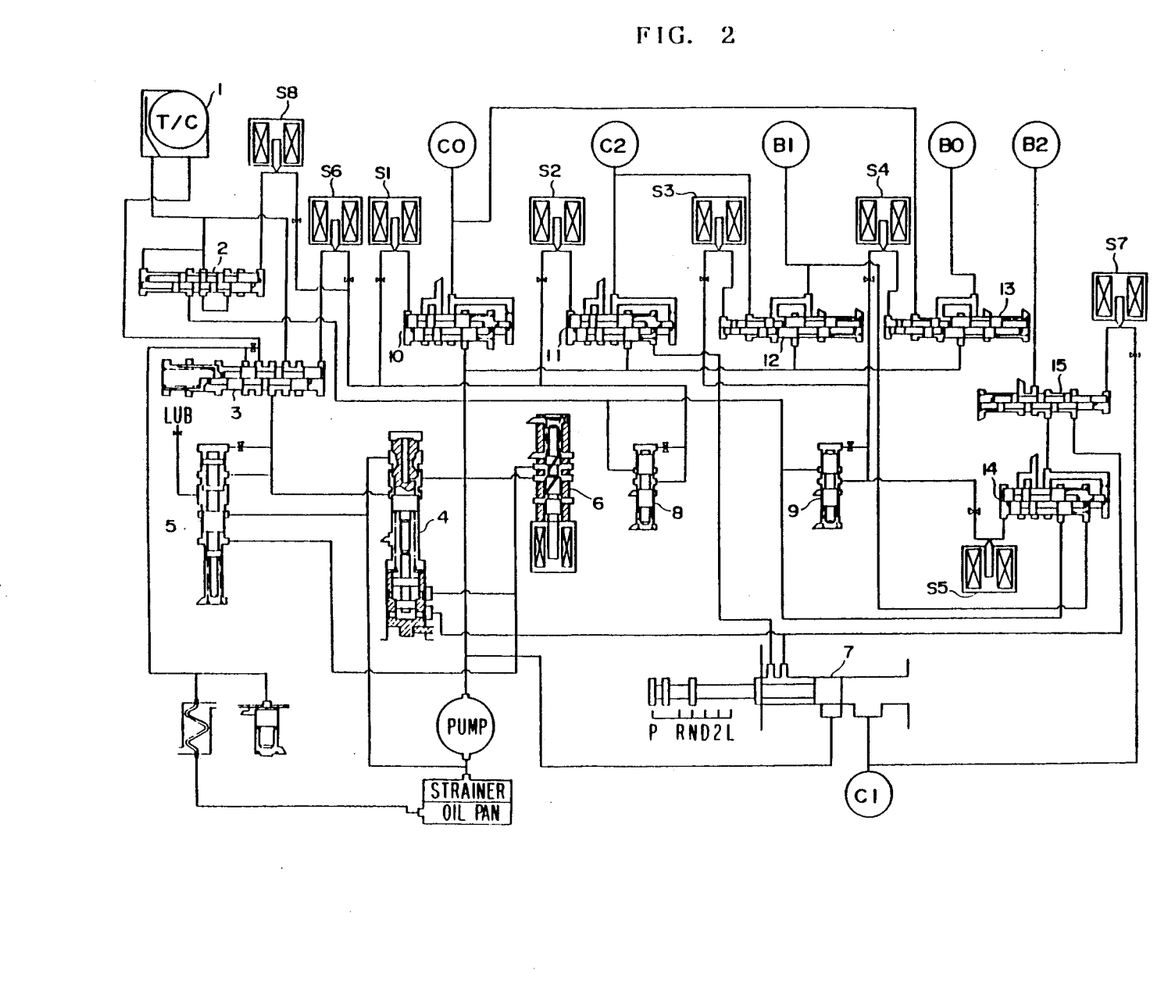
FIG. 2 is an example of a hydraulic circuit diagram of the automatic transmission of FIG. 1.

FIG. 1 illustrates an example of a gear train in which speeds are changed over by the hydraulic control apparatus of the present invention, and FIG. 2 shows an example of a hydraulic control circuit connected to the gear train of FIG. 1.

Shown in FIG. 2 are a torque converter 1, a torque converter duty control valve 2, a lock-up relay valve 3, a regulator valve 4, a secondary regulator valve 5, a throttle valve 6, a manual valve 7, modulator valves 8 and 9, a C0 duty control valve 10, a C2 duty control valve 11, a B1 duty control valve 12, a B0 duty control valve 13, a B2 duty control valve 14, and a reverse inhibitor valve 15.

Also shown in FIG. 2 are a duty solenoid valve S1 for C0, a duty solenoid valve S2 for C2, a duty solenoid valve S3 for B1, a duty solenoid valve S4 for B0, a duty solenoid valve S5 for B2, an on/off solenoid valve S6 for the lock-up relay valve, an on/off solenoid valve S7 for the reverse inhibitor valve, and an on/off solenoid valve S8 for the torque converter duty control valve. With the exception of the solenoid valve S7, all of these valves are of the normally-closed type.

The following table shows the operation, at each speed, of the friction elements and solenoid valves in the gear train and hydraulic control circuit of FIGS. 1 and 2:

TABLE

| | S1 C0 | — C1 | S2 C2 | S4 B0 | S3 B1 | S5 B2 | S7 (B2) | S6 L/C | S8 |
|---|---|---|---|---|---|---|---|---|---|
| P | o | x | x | x | x | x | o | x | x |
| R | o | x | o | x | x | x | o | x | x |
| N | o | x | x | x | x | x | o | x | x |
| O/D | x | o | o | o | x | x | o | o | o |
| 3rd | o | o | o | x | x | x | o | o | o |
| 2nd | o | o | x | x | o | x | o | (o) | (o) |
| 1st | o | o | x | x | x | o | o | x | x |

In an automatic transmission having the foregoing gear train and hydraulic control circuit, the pilot pressure of the C2 duty control valve 11 becomes zero by turning off the duty solenoid valve S2 for C2 in a case where there is a power-on downshift (kick-down) from the 3rd range to the 2nd range (i.e., a case where the C2 hydraulic pressure is released and the B1 hydraulic pressure is introduced), by way of example. As a result, the C2 duty control valve 11 is closed and the hydraulic pressure delivered to the clutch C2 becomes zero, thereby releasing the clutch C2.

Figure 3:
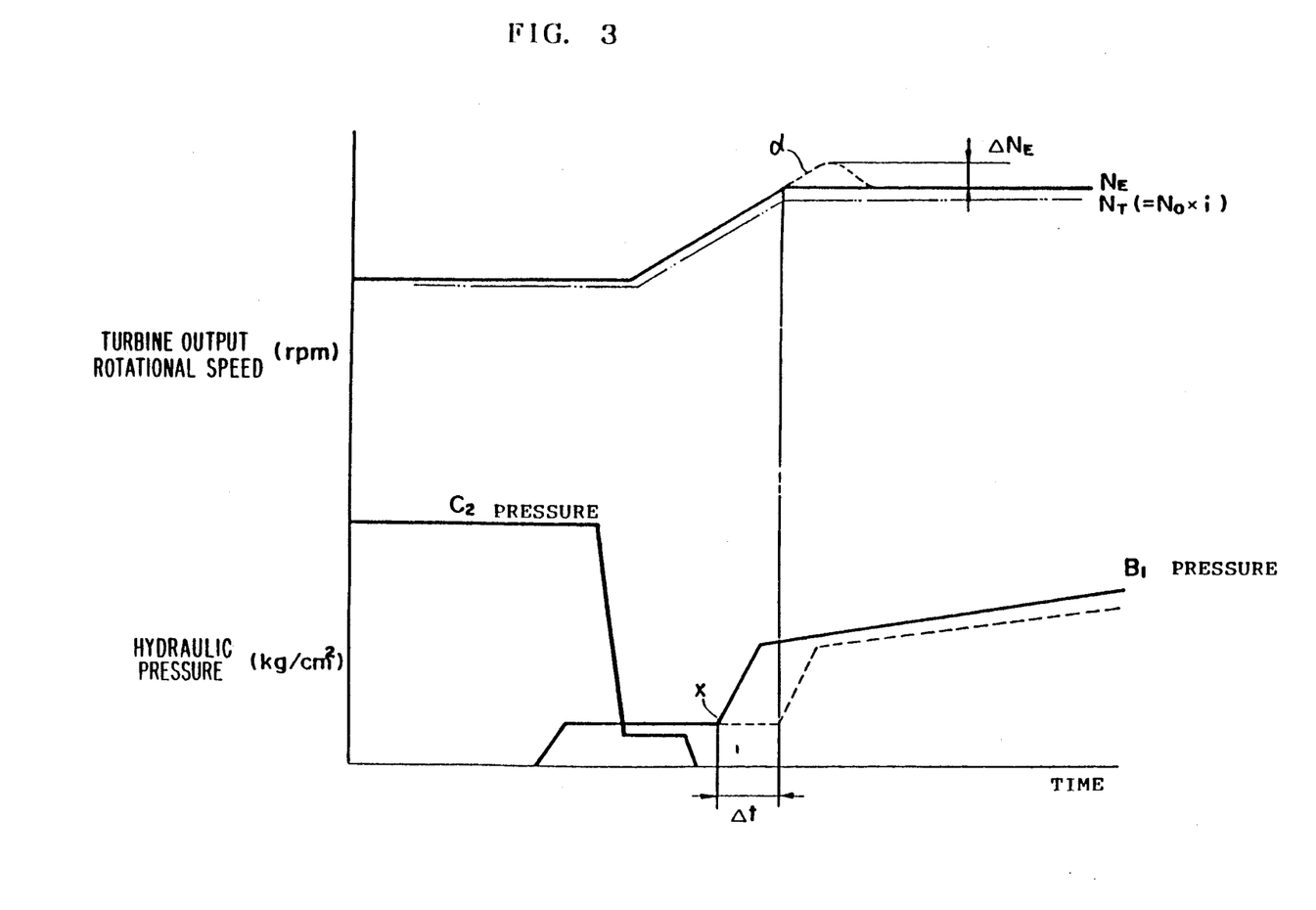
FIG. 3 is a graph showing the relationship between engine rotational speed and hydraulic characteristic in an automatic transmission.

At this time the path which transmits the input torque to the output shaft is interrupted and the gear train enters the neutral state. Consequently, unless the hydraulic pressure of brake B1 starts rising at a point where turbine rotation and engine rotation are in synchronism, namely at point x in FIG. 3, the engine will rev up and the driver will experience an unpleasant sensation. For example, if the rise in the B1 hydraulic pressure is delayed by time $\Delta t$ in FIG. 3, engine rev-up $\alpha$ equivalent to an engine speed $\Delta N_E$ occurs. In FIG. 3, $N_E$ represents engine rotational speed, and $N_T$ denotes turbine rotational speed. The latter is expressed by the following equation:

$$N_T = i \times N_T$$

i: low-gear ratio
$N_T$: rotational speed of turbine shaft

In the present embodiment, the rotational speed $N_T$ of the turbine is detected. When the turbine rotational speed attains a value expressed by Eq. (A) below, electronic control is executed based on the detected value to rapidly raise the duty ratio ($SD_{B1}$) of the duty solenoid valve S3 for B1 in FIG. 2 to a value (b %) higher than the usual value (e.g., a % shown in FIG. 4), thereby preventing the delay in the rise of the B1 hydraulic pressure.

The equation for calculating the set rotational speed $N_{T0}$ of the turbine is as follows:

$$N_{T0} = N_T \times i - \Delta N_{T0} \qquad (A)$$

Figure 4:
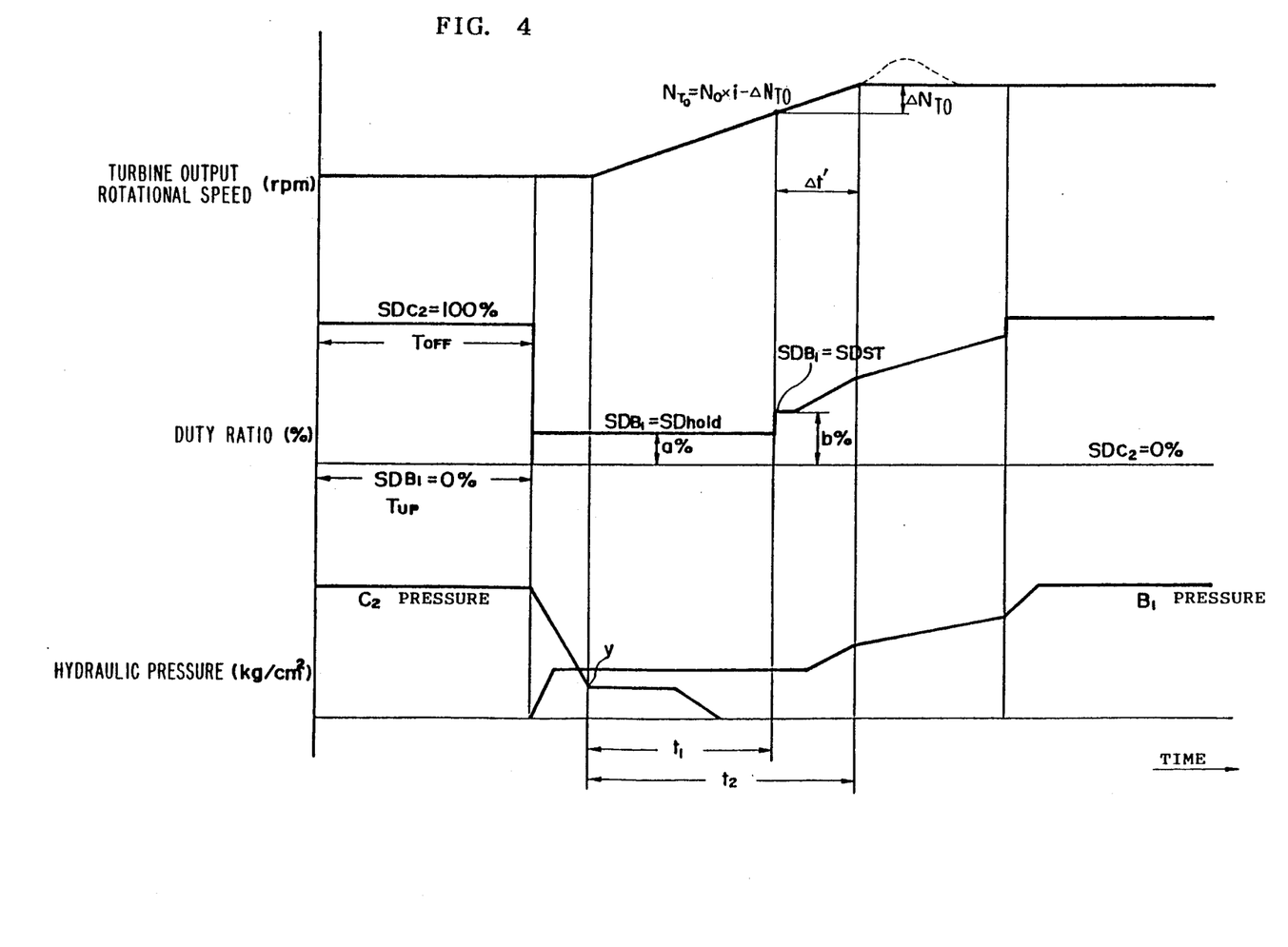
FIG. 4 is a graph showing the relationship among engine rotational speed, duty ratio and hydraulic pressure based on control according to the present invention.
Figure 5:
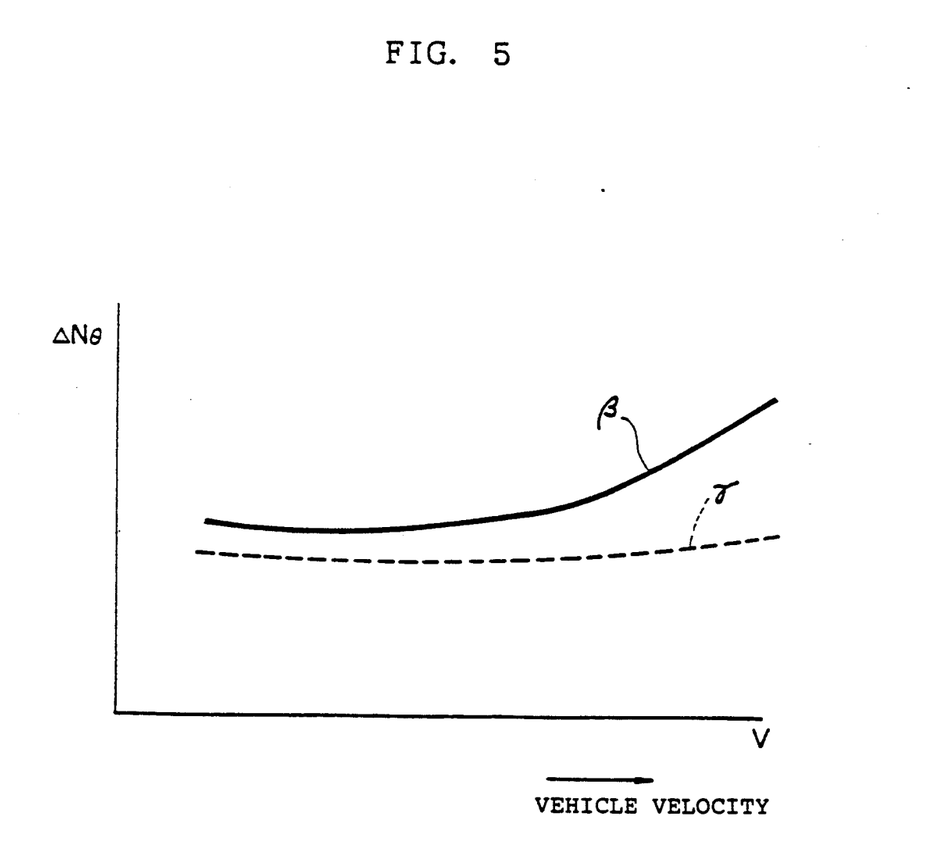
FIG. 5 is a map for correcting $\Delta N_\theta$ in the present invention.

As shown in FIG. 4, $\Delta N_{T0}$ in the above equation indicates a rotational speed that anticipates the delay in the rise of the hydraulic pressure to the B1 brake servo from the B1 duty control valve 12 after the start of operation of the duty solenoid valve S2 for B1. Though $\Delta N_{T0}$ may be a constant value, it is preferred that a map of the kind shown in FIG. 5 be stored in a computer (memory) and that the operation of Eq. (A) be performed while correcting $\Delta N_{T0}$ in dependence upon vehicle velocity to take into account differences in the rise time of the B1 hydraulic pressure with respect to vehicle velocity. Differences in $\Delta N_\theta$ develop due to a difference in the point at which engine rotation begins rising, which depends upon vehicle velocity. The solid line $\beta$ in FIG. 5 indicates the case for a diesel engine, and the broken line $\gamma$ shows the case for a gasoline engine.

Here C2 hydraulic pressure shown in FIG. 4 declines, and time $t_1$ from the rise starting point (point y) of engine rotation to a point at which the duty ratio of the duty control valve S3 for B1 is raised differs depending upon vehicle velocity at the time of a power-on downshift. Specifically, assume that the third speed gear ratio is 1 and that the second speed gear ratio is 1.53:

1) When vehicle velocity, namely the rotational speed of the output shaft is 2000 rpm, turbine rotational speed $N_T$ prior to a shift is 2000 rpm and turbine rotational speed $N_T'$ after a shift is $2000 \times 1.53 = 3060$ rpm. Accordingly, a difference $\Delta N_{T1}$ in the turbine output rotational speed is 1060 rpm.

2) By contrast, when the rotational speed of the output shaft is 1000 rpm, turbine rotational speed $N_T$ prior to a shift is 1000 rpm and turbine rotational speed $N_T'$ after a shift is $1000 \times 1.53 = 1530$ rpm. Accordingly, a difference $\Delta N_{T2}$ in the turbine output rotational speed is 530 rpm.

A comparison of the foregoing cases 1) and 2) shows that a difference develops in the engine rev-up time equivalent to $\Delta N_{T1} - \Delta N_{T2} = 530$ rpm. Accordingly, when time $t_1$ is fixed, engine rev-up cannot be effectively prevented because the timing at which the engine rotational speed rises and the timing at which the B1 hydraulic pressure rises do not agree. It will therefore be understood that computing (processing) the turbine rotational speed $N_T$ based on Eq. (A) is effective.

Though a method is conceivable in which time $t_2$ shown in FIG. 4 is formed as a map with respect to vehicle velocity and time $t_1$ at each respective vehicle velocity is stored in a computer, there are instances where good synchronization cannot be achieved owing to the influence of differences in engine rotation and differences in hydraulic pressure.

The foregoing control of the timing of the rise in the B1 hydraulic pressure will now be described in sequence based on the flow chart of FIG. 6.

Figure 6:
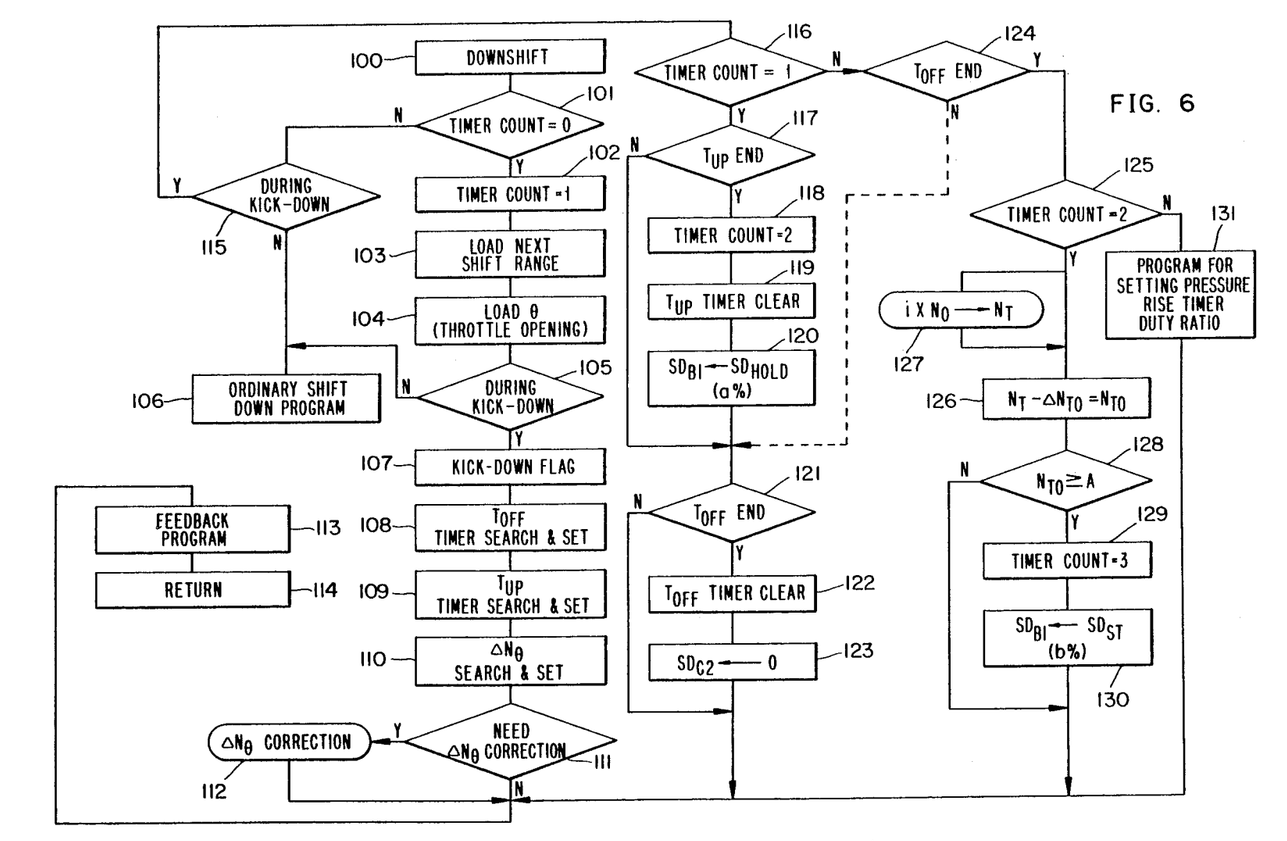
FIG. 6 is a flow chart illustrating duty ratio control in the present invention.

When a downshift is commanded at step 100 in the flow chart of FIG. 6, it determines at step 101 whether the shift has started. If the answer is YES, the processing of steps 102–104 is executed, after which it is determined at step 105 whether the shift is a kick-down shift (power-on downshift). If the answer received at step 105 is NO, then the speed change is made in accordance with an ordinary shift-down program at step 106. If the answer at step 105 is YES, on the other hand, the processing of steps 107–110 is executed, after which it is determined at step 111 whether $\Delta N_{T0}$ is to be corrected. If the answer is YES, then $\Delta N_{T0}$ is corrected at step 112 based on the map of FIG. 5, a feedback program is executed at step 113 and the program returns at step 114.

If a NO decision is rendered at step 101, it is immediately determined at step 115 whether kick-down is being performed. If the answer at step 115 is NO, then the speed change is made in accordance with the ordinary shift-down program at step 106 in the manner set forth above. If the answer at step 115 is YES, it is determined at step 116 whether the timer count is 1. If a YES decision is rendered at step 116, then it is determined at step 117 whether a $T_{UP}$ timer (see FIG. 4) has run out of time. If the answer is YES, then the processing of steps 118–119 is executed, after which the duty ratio ($SD_{B1}$) of the duty solenoid valve S3 for B1 is set at a % ($SD_{hold}$) at step 120. Next, it is determined at step 121 whether a $T_{OFF}$ timer (see FIG. 4) has run out of time. If the answer is YES, then the $T_{OFF}$ timer is cleared at step 122, after which the duty ratio ($SD_{C2}$) of the duty solenoid valve S2 of for C2 is made zero at step 123.

If the decision rendered at step 116 is NO, it is determined at step 124 whether a $T_{OFF}$ timer has run out of time. If the answer is YES, it is determined at step 125 whether the timer count is 2. If the answer at step 125 is NO, a program for setting the timer duty ratio of the hydraulic pressure rise is executed at step 131, after which the feedback program is executed at step 113.

If the decision rendered at step 125 is YES, namely when $SD_{B1}$ is set at $SD_{hold}$ ($SD_{B1}=a$), step 126 is executed to perform the calculation $N_T - \Delta N_{T0} = N_{T0}$. Here $N_T$ represents the product of output rotational speed i and $N_{T0}$ (step 127), and $\Delta N_{T0}$ represents the value after correction based on the map of FIG. 5. The calculated value $N_{T0}$ and the turbine rotational speed $N_T$ at the moment of determination are compared at step 128. When the turbine rotational speed $N_T$ exceeds the calculated value $N_{T0}$, the timer count is made 3 at step 129 and the duty ratio $SD_{B1}$ of the duty solenoid valve S3 for B1 is raised to b % ($SD_{ST}$) at step 130.

Though the foregoing embodiment has been described with regard to an automatic transmission having the gear train and hydraulic control circuit of FIGS. 1 and 2, the invention is applicable to any automatic transmission so long as it is one in which a downshift is performed by releasing one friction element and engaging another friction element.

As many apparently widely different embodiments of the present invention can be made without departing from the spirit and scope thereof, it is to be understood that the invention is not limited to the specific embodiments thereof except as defined in the appended claims.

What is claimed is:

1. A hydraulic control apparatus for an automatic transmission having a plurality of friction engaging elements for performing a downshift by releasing one friction engaging element and engaging another friction engaging element, comprising:

duty control valves connected to respective ones of the friction engaging elements;

duty solenoid valves connected to oil lines for supplying pilot hydraulic pressure to respective ones of said duty control valves; and control means so adapted that in a case where a release duty signal is outputted to one duty solenoid valve to control the pilot hydraulic pressure to thereby release the one friction engaging element, and a downshift is a power-on downshift, the duty ratio of said other duty solenoid valve is raised to a predetermined value to raise engaging hydraulic pressure supplied to the other friction engaging element if rotational speed of an input shaft of the automatic transmission is greater than a difference between the product of turbine shaft rotational speed and low-side gear ratio and a rotational speed commensurate with a delay in upturn of rotation of the input shaft of the automatic transmission.

2. The apparatus according to claim 1, wherein said control means includes:

means for determining whether the downshift is a power-on downshift and, when the downshift is a power-on downshift, reducing the duty ratio of the one duty solenoid valve from 100% to 0%, and simultaneously raising the duty ratio of the other duty solenoid valve from 0% to the predetermined value, means for thereafter calculating the difference between the product of turbine shaft rotational speed and low-side gear ratio and the rotational speed commensurate with the delay in the upturn of the rotation of the input shaft, and means for comparing the calculated value and the rotational speed of the input shaft, and raising the duty ratio of the other duty solenoid valve to a value higher than said predetermined value when the rotational speed of the input shaft surpasses the calculated value.

3. The apparatus according to claim 1, wherein said control means further includes means for correcting the rotational speed commensurate with the delay in the upturn of the rotation of the input shaft, said correction being made in conformity with vehicle velocity at the time of the power-on downshift.

4. The apparatus according to claim 3, wherein the higher the vehicle speed at the time of the power-on downshift, the larger the value to which said control means corrects the rotational speed commensurate with the delay in the upturn of the rotation of the input shaft.

5. The apparatus according to claim 1, wherein the automatic transmission is a forward 4-speed transmission having clutches C0, C1, C2 and brakes B0, B1, B2, the one duty solenoid valve is a duty solenoid valve for C2 connected to a C2 duty control valve, and the other duty solenoid valve is a duty solenoid valve for B1 connected to a B1 duty solenoid valve.

* * * * *